United States Patent
Gaedt et al.

(10) Patent No.: US 10,865,144 B2
(45) Date of Patent: Dec. 15, 2020

(54) METHOD FOR PRODUCING A DISPERSANT

(71) Applicant: BASF SE, Ludwigshafen (DE)

(72) Inventors: Torben Gaedt, Traunstein (DE);
Joachim Dengler, Tacherting (DE);
Martin Winklbauer, Halsbach (DE);
Manfred Bichler, Engelsberg (DE);
Oliver Mazanec, Rosenheim (DE)

(73) Assignee: BASF SE, Ludwigshafen (DE)

( * ) Notice: Subject to any disclaimer, the term of this patent is extended or adjusted under 35 U.S.C. 154(b) by 448 days.

(21) Appl. No.: 15/554,984

(22) PCT Filed: Mar. 3, 2016

(86) PCT No.: PCT/EP2016/054573
§ 371 (c)(1),
(2) Date: Aug. 31, 2017

(87) PCT Pub. No.: WO2016/146402
PCT Pub. Date: Sep. 22, 2016

(65) Prior Publication Data
US 2018/0044238 A1    Feb. 15, 2018
US 2018/0230052 A9    Aug. 16, 2018

(30) Foreign Application Priority Data
Mar. 13, 2015  (EP) .................... 15158957

(51) Int. Cl.
| C04B 28/04 | (2006.01) |
| C04B 24/28 | (2006.01) |
| C04B 40/00 | (2006.01) |
| C08K 3/34 | (2006.01) |
| C08J 3/12 | (2006.01) |
| C04B 103/00 | (2006.01) |
| C04B 103/40 | (2006.01) |

(52) U.S. Cl.
CPC .......... *C04B 24/281* (2013.01); *C04B 28/04* (2013.01); *C04B 40/0042* (2013.01); *C08J 3/122* (2013.01); *C08K 3/346* (2013.01); *C04B 2103/0057* (2013.01); *C04B 2103/408* (2013.01)

(58) Field of Classification Search
CPC ... C04B 24/281; C04B 24/04; C04B 40/0042; C04B 2103/0057; C04B 2103/408; C08J 3/122; C08K 3/346
USPC ......................................................... 264/13
See application file for complete search history.

(56) References Cited

U.S. PATENT DOCUMENTS

| 4,725,665 | A | 2/1988 | Pieh et al. |
| 5,798,425 | A | 8/1998 | Albrecht et al. |
| 6,211,317 | B1 | 4/2001 | Albrecht et al. |
| 6,573,316 | B1 | 6/2003 | Albrecht et al. |
| 6,620,879 | B1 | 9/2003 | Albrecht et al. |
| 6,946,510 | B2 | 9/2005 | Suau et al. |
| 7,655,710 | B2 | 2/2010 | Hommer et al. |
| 7,910,640 | B2 | 3/2011 | Wieland et al. |
| 8,053,498 | B2 | 11/2011 | Wieland et al. |
| 8,481,116 | B2 | 7/2013 | Bleibler et al. |
| 2004/0019148 | A1 | 1/2004 | Suau et al. |
| 2005/0143511 | A1 | 6/2005 | Suau et al. |
| 2006/0111478 | A1 | 5/2006 | Hommer et al. |
| 2008/0108732 | A1 | 5/2008 | Wieland et al. |
| 2009/0054558 | A1 | 2/2009 | Wieland et al. |
| 2009/0199741 | A1 | 8/2009 | Bleibler et al. |
| 2009/0312460 | A1 | 12/2009 | Lorenz et al. |

FOREIGN PATENT DOCUMENTS

| CN | 101962273 A | 2/2011 |
| DE | 29 48 698 A1 | 6/1981 |
| DE | 35 30 258 A1 | 2/1987 |
| DE | 195 13 126 A1 | 10/1996 |
| DE | 198 34 173 A1 | 2/1999 |
| DE | 199 05 488 A1 | 8/2000 |
| JP | H 06-239652 A | 8/1994 |
| JP | 2001-294463 A | 10/2001 |
| JP | 2002-193848 A | 7/2002 |
| WO | WO 00/17263 | 3/2000 |
| WO | WO 01/96007 A1 | 12/2001 |
| WO | WO 03/097721 A1 | 11/2003 |
| WO | WO 2006/027363 A1 | 3/2006 |
| WO | WO 2006/042709 A1 | 4/2006 |
| WO | WO 2007/071361 A1 | 6/2007 |
| WO | WO 2010/040612 A1 | 4/2010 |

OTHER PUBLICATIONS

PCT/EP2016/054573—International Search Report, dated May 18, 2016. English Translation.
PCT/EP2016/054573—International Written Opinion, dated May 18, 2016. English Translation.
PCT/EP2016/054573—International Preliminary Report on Patentability, dated Sep. 19, 2017.

*Primary Examiner* — Jeffrey M Wollschlager
*Assistant Examiner* — Xue H Liu
(74) *Attorney, Agent, or Firm* — Curatolo Sidoti Co., LPA; Salvatore A. Sidoti

(57) ABSTRACT

The invention relates to a method for producing a dispersant, comprising the steps of
a) providing at least one water-soluble polymer comprising polyether groups,
b) providing an inorganic component comprising at least one phyllosilicate which has an integral sheet charge of 0, 1 or 2, c) producing an aqueous suspension comprising the at least one water-soluble polymer comprising polyether groups and the inorganic component comprising the at least one phyllosilicate, and d) spray-drying the aqueous suspension to give a solid. Additionally disclosed is the use of the dispersant of the invention in an inorganic binder composition.

13 Claims, No Drawings

METHOD FOR PRODUCING A DISPERSANT

CROSS REFERENCE TO RELATED APPLICATIONS

This application is a national stage application of International Application No. PCT/EP2016/054573, filed 3 Mar. 2016, which claims priority from European Patent Application No. 15158957.9, filed 13 Mar. 2015, which applications are incorporated herein by reference.

The invention relates to a method for producing a dispersant. Additionally disclosed is the use of the dispersant for an inorganic binder composition.

In order to endow inorganic solids suspensions with enhanced workability, i.e., kneadability, spreadability, sprayability, pumpability or flowability, they are often admixed with admixtures in the form of dispersants or plasticizers.

In the construction industry, such inorganic solids normally comprise inorganic binders such as, for example, cement based on Portland cement (EN 197), cement with particular properties (DIN 1164), white cement, calcium aluminate cement or high-alumina cement (EN 14647), calcium sulfoaluminate cement, specialty cements, calcium sulfate n-hydrate (n=0 to 2), lime or building-lime (EN 459), and also pozzolans and latent hydraulic binders such as, for example, flyash, metal kaolin, silica dust, and slag sand. The inorganic solids suspensions further generally comprise fillers, more particularly aggregate consisting, for example, of calcium carbonate, quartz or other natural minerals in various grain sizes and grain shapes, and also further inorganic and/or organic additives (admixtures) for the targeted influencing of properties of chemical products used in construction, such as hydration kinetics, rheology or air content, for example. Additionally present may be organic binders such as latex powders, for example.

In order for building material mixtures, based more particularly on inorganic binders, to be converted into a workable, ready-to-use form, the amount of mixing water required is generally substantially more than would be necessary for the subsequent hydration or hardening process. The void fraction in the construction element that is formed by the excess water, which later evaporates, leads to significantly impaired mechanical strength, stability, and durability of adhesion.

In order to reduce this excess water fraction for a specified working consistency and/or to improve the workability in the case of a specified water/binder ratio, admixtures are used which are referred to generally in construction chemistry as water reducers or plasticizers. Known such admixtures include, in particular, polycondensation products based on naphthalenesulfonic or alkylnaphthalenesulfonic acids and/or on melamine-formaldehyde resins containing sulfonic acid groups.

DE 3530258 describes the use of water-soluble sodium naphthalenesulfonic acid-formaldehyde condensates as admixtures for inorganic binders and building materials. These admixtures are described as improving the flowability of the binders such as cement, anhydrite or gypsum, for example, and also the building materials produced using them.

DE 2948698 describes hydraulic mortars for screeds, comprising plasticizers based on melamine-formaldehyde condensation products and/or sulfonated formaldehyde-naphthalene condensates and/or lignosulfonate and, as binders, Portland cement, clay-containing lime marl, clay clinkers, and soft-fired clinkers.

In addition to the purely anionic plasticizers, which contain essentially carboxylic acid and sulfonic acid groups, a more recent group of plasticizers described comprises weakly anionic comb polymers, which customarily carry anionic charges on the main chain and include nonionic polyalkylene oxide side chains.

WO 01/96007 describes these weakly anionic plasticizers and grinding assistants for aqueous mineral suspensions, prepared by radical polymerization of monomers containing vinyl groups and comprising polyalkylene oxide groups as a main component.

DE 19513126 and DE 19834173 describe copolymers based on unsaturated dicarboxylic acid derivatives and oxyalkylene glycol alkenyl ethers and the use thereof as admixtures for hydraulic binders, especially cement.

The aim of adding plasticizers in the construction industry is either to increase the plasticity of the binder system or to reduce the amount of water required under given working conditions.

It has emerged that plasticizers based on lignosulfonate, melamine-sulfonate, and polynaphthalenesulfonate are significantly inferior in their activity to the weakly anionic, polyalkylene oxide-containing copolymers. These copolymers are also referred to as polycarboxylate ethers (PCEs). Polycarboxylate ethers not only disperse the inorganic particles via electrostatic charging, owing to the anionic groups (carboxylate groups, sulfonate groups) present on the main chain, but also, furthermore, stabilize the dispersed particles by steric effects owing to the polyalkylene oxide side chains, which absorb molecules of water to form a stabilizing protective layer around the particles.

As a result, either it is possible to reduce the required amount of water for the formulating of a particular consistency, as compared with the conventional plasticizers, or else the addition of the polycarboxylate ethers reduces the plasticity of the wet building-material mixture to such an extent that it is possible to produce self-compacting concrete or self-compacting mortar with low water/cement ratios. Additionally, the use of the polycarboxylate ethers makes it possible to produce ready-mixed concrete or ready-mixed mortar that remains pumpable for lengthy periods of time, or to produce high-strength concretes or high-strength mortars by formulation of a low water/cement ratio.

In addition to the polycarboxylate ethers described, a series of derivatives with modified activity profile have now also become known. For example, US 2009312460 describes polycarboxylate esters, where the ester function is hydrolyzed subsequent to introduction into a cementitious, aqueous mixture, to form a polycarboxylate ether. An advantage of polycarboxylate esters is that they develop their activity only after a certain time in the cementitious mixture, and, consequently, the dispersing effect can be maintained over a relatively long period of time.

Dispersants based on polycarboxylate ethers and derivatives thereof are available either as solids in powder form or aqueous solutions. Polycarboxylate ethers in powder form may be admixed, for example, to a factory dry-mix mortar in the course of its production. When the factory dry-mix mortar is mixed with water, the polycarboxylate ethers dissolve and are able subsequently to develop their effect.

DE 199 05 488 discloses polymer compositions in powder form that are based on polyether carboxylates, comprising 5 to 95 wt % of the water-soluble polymers and 5 to 95 wt % of a finely divided mineral carrier material. The products are produced by contacting the mineral carrier material with a melt or an aqueous solution of the polymer. Advantages touted for this product in comparison to spray-dried products include significantly enhanced sticking resistance and caking resistance.

Furthermore, JP 2001294463 discloses a dispersant in powder form for cementitious systems, based on polycarboxylate ethers, which has its flowability enhanced by addition of an inorganic powder. Kaolinite is one of the inorganic powders disclosed. The mixing of the powder-form dispersant with the inorganic powder is variously described. In one scenario disclosed, the inorganic powder can be admixed to the spray-dried, powder-form dispersant while still in the drying tower. The conjoint spray-drying of inorganic powder and dispersant is not disclosed.

JP H06-239652 discloses a method for producing dispersants in powder form for cementitious systems on the basis of polycarboxylate ethers and inorganic powders. One of the inorganic powder components disclosed is bentonite. Drying takes place by spray drying, with the inorganic powder being added right at the spray-drying stage. An inorganic component in line with the present invention, comprising at least one phyllosilicate having an integral sheet charge of 0, 1 or 2, is not disclosed.

The problem addressed by CN 101962273 is that of providing a method for producing a powder-form dispersant where the resulting product has a very low calking tendency. In this method, a fine inorganic powder or sol is mixed with a solution of a polycarboxylic acid polymer. The mixture is subsequently atomized and the water is removed in a drying chamber. At the same time, inorganic auxiliaries are added as anticaking agents. A disadvantage here, however, is that on application, the powders produced have significantly poorer development of activity by comparison with a solution of the polycarboxylic acid polymer.

Disclosed in WO 2006/027363 is a method for producing a coated base material for a hydraulic composition. Disclosure in the examples includes the coating of a Portland cement with 1% of an aqueous polycarboxylate ether solution, based on the binder weight.

By virtue of their physical properties, many polymeric dispersants are difficult to convert into powder form and are therefore made available in the form of their aqueous solutions. For many applications, such as dry-mix mortars, however, it is vital to provide dispersants in solid form. Generally, therefore, there was a need to provide a method allowing polymeric dispersants to be converted into solids, and for the performance properties, especially the development of activity on application, to be as close as possible to those of the aqueous solution of the polymeric dispersant.

It was an object of the present invention, accordingly, to provide a dispersant in solid form that has very good powder properties, these properties being retained in particular under thermal and mechanical loading. At the same time, when used in the form of a solid, as for example in an inorganic binder composition, the dispersant ought as far as possible to correspond in terms of its effect and development of effect to the aqueous solution of this dispersant.

This object has been achieved by means of a method for producing a dispersant, comprising the steps of
a) providing at least one water-soluble polymer comprising polyether groups,
b) providing an inorganic component, comprising at least one phyllosilicate which has an integral sheet charge of 0, 1 or 2,
c) preparing an aqueous suspension comprising the at least one water-soluble polymer comprising polyether groups and the inorganic component comprising the at least one phyllosilicate,
d) spray-drying the aqueous suspension to give a solid.

Surprisingly it has emerged here not only that the stated object could be achieved to its full extent, but also that the powder-form composition has excellent working properties.

Surprisingly it has also been found that a powder-form mixture comprising the dispersant obtained by the method of the invention leads to very similar chronological development of the dispersing activity of the polymer following addition of mixing water, compared with the addition of the dispersant in the mixing water.

The water-soluble polymers corresponding to the present invention preferably comprise at least two monomer units. It can, however, also be advantageous to use copolymers having three or more monomer units.

With particular preference the water-soluble polymer of the invention comprises at least one group from the series consisting of carboxyester, carboxyl, phosphono, sulfino, sulfo, sulfamido, sulfoxy, sulfoalkyloxy, sulfinoalkyloxy, and phosphonooxy group. With more particular preference the polymer of the invention comprises an acid group. The term "acid group" in the present specification refers both to the free acid and also salts thereof. The acid may preferably be at least one from the series consisting of carboxyl, phosphono, sulfino, sulfo, sulfamido, sulfoxy, sulfoalkyloxy, sulfinoalkyloxy, and phosphonooxy group. Particularly preferred are carboxyl and phosphonooxy groups. In an embodiment which is also particularly preferred, the water-soluble polymer of the invention comprises at least one carboxy ester group, which more particularly is a hydroxyalkyl ester. The alkyl group of the hydroxyalkylesters comprises preferably 1 to 6, preferably 2 to 4, carbon atoms.

"Water-soluble polymers" in the context of the present specification are polymers which in water at 20° C. under atmospheric pressure have a solubility of at least 1 gram per liter, more particularly at least 10 grams per liter, and very preferably at least 100 grams per liter.

In one preferred embodiment, the polyether groups of the at least one water-soluble polymer are polyether groups of the structural unit (I),

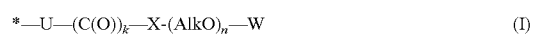

$$*-U-(C(O))_k-X-(AlkO)_n-W \qquad (I)$$

where
indicates the bonding site to the polymer,
U is a chemical bond or an alkylene group having 1 to 8 carbon atoms,
X is oxygen, sulfur or a group $NR^1$,
k is 0 or 1,
n is an integer whose average value based on the polymer is in the range from 3 to 300,
Alk is $C_2$-$C_4$ alkylene, it being possible for Alk to be identical or different within the group $(Alk-O)_n$.
W is a hydrogen, a $C_1$-$C_6$ alkyl or an aryl radical or is the group Y—F, where
Y is a linear or branched alkylene group having 2 to 8 carbon atoms and may carry a phenyl ring,
F is a 5- to 10-membered nitrogen heterocycle which is bonded via nitrogen and which as ring members, besides the nitrogen atom and besides carbon atoms, may have 1, 2 or 3 additional heteroatoms, selected from oxygen, nitrogen, and sulfur, it being possible for the nitrogen ring members to have a group $R^2$, and for 1 or 2 carbon ring members to be present in the form of a carbonyl group,
$R^1$ is hydrogen, $C_1$-$C_4$ alkyl or benzyl, and
$R^2$ is hydrogen, $C_1$-$C_4$ alkyl or benzyl.

In one particularly preferred embodiment, the water-soluble polymer comprising polyether groups represents a polycondensation product comprising (II) a structural unit comprising an aromatic or heteroaromatic and the polyether group, and (III) a phosphated structural unit comprising an aromatic or heteroaromatic.

The structural units (II) and (III) are represented preferably by the following general formulae

$$A-U-(C(O))_k-X-(AlkO)_n-W \quad (II)$$

where

A is identical or different and is represented by a substituted or unsubstituted, aromatic or heteroaromatic compound having 5 to 10 carbon atoms in the aromatic system, the other radicals possessing the definition stated for structural unit (I);

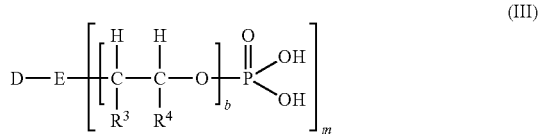

where

D is identical or different and is represented by a substituted or unsubstituted, aromatic or heteroaromatic compound having 5 to 10 carbon atoms in the aromatic system.

Furthermore, E is identical or different and is represented by N, NH or O, m=2 if E=N and m=1 if E=NH or O.

$R^3$ and $R^4$ independently of one another are identical or different and are represented by a branched or unbranched $C_1$ to $C_{10}$ alkyl radical, $C_5$ to $C_8$ cycloalkyl radical, aryl radical, heteroaryl radical or H, preferably by H, methyl, ethyl or phenyl, more preferably by H or methyl, and especially preferably by H. Furthermore, b is identical or different and is represented by an integer from 0 to 300. If b=0, then E=O. More preferably D=phenyl, E=O, $R^3$ and $R^4$=H, and b=1.

The polycondensation product preferably comprises a further structural unit (IV), which is represented by the following formula

where

Y independently of one another is identical or different and is represented by (II), (III) or further constituents of the polycondensation product.

$R^5$ and $R^6$ are preferably identical or different and are represented by H, $CH_3$, COOH, or a substituted or unsubstituted, aromatic or heteroaromatic compound having 5 to 10 carbon atoms. In structural unit (IV) here, $R^5$ and $R^6$ independently of one another are preferably represented by H, COOH and/or methyl.

In one particularly preferred embodiment, $R^5$ and $R^6$ are represented by H.

The molar ratio of the structural units (II), (III), and (IV) in the phosphated polycondensation product of the invention may be varied within wide ranges. It has proven useful for the molar ratio of the structural units [(II)+(III)]:(IV) to be 1:0.8 to 3, preferably 1:0.9 to 2, and more preferably 1:0.95 to 1.2.

The molar ratio of the structural units (II):(III) is normally 1:10 to 10:1, preferably 1:7 to 5:1, and more preferably 1:5 to 3:1.

The groups A and D in the structural units (II) and (III) of the polycondensation product are usually represented by phenyl, 2-hydroxyphenyl, 3-hydroxyphenyl, 4-hydroxyphenyl, 2-methoxyphenyl, 3-methoxyphenyl, 4-methoxyphenyl, naphthyl, 2-hydroxynaphthyl, 4-hydroxynaphthyl, 2-methoxynaphthyl and/or 4-methoxynaphthyl, preferably phenyl, and A and D may be selected independently of one another and may also each consist of a mixture of the compounds stated. Groups X and E independently of one another are preferably represented by O.

Preferably, n in structural unit (I) is represented by an integer from 5 to 280, more particularly 10 to 160, and very preferably 12 to 120, and b in structural unit (III) is represented by an integer from 0 to 10, preferably 1 to 7, and more preferably 1 to 5. The respective radicals whose length is defined by n and b, respectively, may consist here of unitary structural groups; however, it may also be useful for them to comprise a mixture of different structural groups. Furthermore, independently of one another, the radicals of the structural units (II) and (III) may each possess the same chain length, with n and b each being represented by one number. In general, however, it will be useful for each of them to comprise mixtures having different chain lengths, so that the radicals of the structural units in the polycondensation product have different numerical values for n and, independently, for b.

In one particular embodiment, the present invention further provides for the salt of the phosphated polycondensation product to be a sodium, potassium, ammonium and/or calcium salt and preferably a sodium and/or potassium salt.

The phosphated polycondensation product of the invention often has a weight-average molecular weight of 5000 g/mol to 150 000 g/mol, preferably 10 000 to 100 000 g/mol, and more preferably 20 000 to 75 000 g/mol.

With regard to the phosphated polycondensation products for preferred use in accordance with the present invention, and to their preparation, reference is further made to patent applications WO 2006/042709 and WO 2010/040612, the content of which is hereby incorporated into the specification.

In a further preferred embodiment, the water-soluble polymer comprises at least one copolymer which is obtainable by polymerizing a mixture of monomers comprising (V) at least one ethylenically unsaturated monomer which comprises at least one radical from the series consisting of carboxylic acid, carboxylic salt, carboxylic ester, carboxylic amide, carboxylic anhydride, and carboxylic imide and (VI) at least one ethylenically unsaturated monomer comprising the polyether group, the polyether group being represented preferably by the structural unit (I).

The copolymers in accordance with the present invention comprise at least two monomer units. It may, however, also be advantageous to use copolymers having three or more monomer units.

In one preferred embodiment, the ethylenically unsaturated monomer (V) is represented by at least one of the following general formulae from the group consisting of (Va), (Vb), and (Vc):

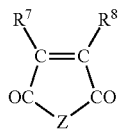

(Vb)

In the monocarboxylic or dicarboxylic acid derivative (Va) and in the monomer (Vb) present in cyclic form, where Z=O (acid anhydride) or $NR^{16}$ (acyl imide), $R^7$ and $R^8$ independently of one another are hydrogen or an aliphatic hydrocarbon radical having 1 to 20 carbon atoms, preferably a methyl group. B is H, —COOM$_a$, —CO—O($C_qH_{2q}O$)$_r$—$R^9$, —CO—NH—($C_qH_{2q}O$)$_r$—$R^9$.

M is hydrogen, a mono-, di- or trivalent metal cation, preferably sodium, potassium, calcium or magnesium ion, additionally ammonium or an organic amine radical, and a=⅓, ½ or 1, depending on whether M is a mono-, di- or trivalent cation. Organic amine radicals used are preferably substituted ammonium groups deriving from primary, secondary or tertiary $C_{1-20}$ alkylamines, $C_{1-20}$ alkanolamines, $C_{5-8}$ cycloalkylamines, and $C_{6-14}$ arylamines. Examples of the corresponding amines are methylamine, dimethylamine, trimethylamine, ethanolamine, diethanolamine, triethanolamine, methyldiethanolamine, cyclohexylamine, dicyclohexylamine, phenylamine, diphenylamine in the protonated (ammonium) form.

$R^9$ is hydrogen, an aliphatic hydrocarbon radical having 1 to 20 carbon atoms, a cycloaliphatic hydrocarbon radical having 5 to 8 carbon atoms, an aryl radical having 6 to 14 carbon atoms, which may optionally also be substituted, q=2, 3 or 4, and r=0 to 200, preferably 1 to 150. The aliphatic hydrocarbons here may be linear or branched and also saturated or unsaturated. Preferred cycloalkyl radicals are cyclopentyl or cyclohexyl radicals, and preferred aryl radicals are phenyl radicals or naphthyl radicals, which in particular may also be substituted by hydroxyl, carboxyl or sulfonic acid groups.

Furthermore, Z is O or $NR^{16}$, where $R^{16}$ independently at each occurrence is identical or different and is represented by a branched or unbranched $C_1$ to $C_{10}$ alkyl radical, $C_5$ to $C_8$ cycloalkyl radical, aryl radical, heteroaryl radical or H.

The following formula represents the monomer (Vc):

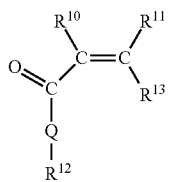

(Vc)

In this formula, $R^{10}$ and $R^{11}$ independently of one another are hydrogen or an aliphatic hydrocarbon radical having 1 to 20 carbon atoms, a cycloaliphatic hydrocarbon radical having 5 to 8 carbon atoms, or an optionally substituted aryl radical having 6 to 14 carbon atoms.

Furthermore, $R^{12}$ is identical or different and is represented by ($C_nH_{2n}$)—$SO_3H$ where n=0, 1, 2, 3 or 4, ($C_nH_{2n}$)—OH where n=0, 1, 2, 3 or 4; ($C_nH_{2n}$)—$PO_3H_2$ where n=0, 1, 2, 3 or 4, ($C_nH_{2n}$)—$OPO_3H_2$ where n=0, 1, 2, 3 or 4, ($C_6H_4$)—$SO_3H$, ($C_6H_4$)—$PO_3H_2$, ($C_6H_4$)—$OPO_3H_2$ and ($C_nH_{2n}$)—$NR^{14}$b where n=0, 1, 2, 3 or 4 and b is represented by 2 or 3.

$R^{13}$ is H, —COOM$_a$, —CO—O($C_qH_{2q}O$)$_r$—$R^9$, —CO—NH—($C_qH_{2q}O$)$_r$—$R^9$, where M$_a$, $R^9$, q, and r possess the definitions stated above.

$R^{14}$ is hydrogen, an aliphatic hydrocarbon radical having 1 to 10 carbon atoms, a cycloaliphatic hydrocarbon radical having 5 to 8 carbon atoms, or an optionally substituted aryl radical having 6 to 14 carbon atoms.

Furthermore, Q is identical or different and is represented by NH, $NR^{15}$ or O, and $R^{15}$ is an aliphatic hydrocarbon radical having 1 to 10 carbon atoms, a cycloaliphatic hydrocarbon radical having 5 to 8 carbon atoms, or an optionally substituted aryl radical having 6 to 14 carbon atoms.

In one particularly preferred embodiment, the ethylenically unsaturated monomer (VI) is represented by the following general formulae

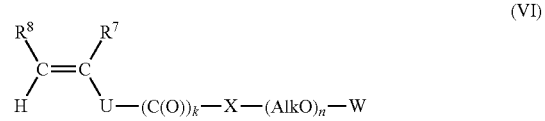

(VI)

in which all radicals have the definitions stated above.

In particular, the copolymer has an average molar weight (Mw) of between 5000 and 150 000 g/mol, more preferably 10 000 to 80 000 g/mol, and very preferably 15 000 to 60 000 g/mol, as determined by gel permeation chromatography.

The polymers are analyzed by size exclusion chromatography for average molar mass and conversion (column combinations: Shodex OH-Pak SB 804 HQ and OH-Pak SB 802.5 HQ from Showa Denko, Japan; eluent: 80 vol % aqueous solution of $HCO_2NH_4$ (0.05 mol/l) and 20 vol % MeOH; injection volume 100 μl; flow rate 0.5 ml/min).

The copolymer of the invention preferably meets the requirements of the industry standard EN 934-2 (February 2002).

Spray drying, also called atomization drying, is a process for the drying of solutions, suspensions or pasty masses. Using a nozzle, which in general is operated by the liquid pressure, compressed air or inert gas, or using rotating atomizer discs (4000-50 000 revolutions/min), the material for drying is introduced into a hot air stream, which dries it to a fine powder within a very short time. Depending on the type of construction or the end use, it is possible for the hot air to flow in the same direction as the spraying jet, in other words according to the cocurrent principle, or against the spray jet, in order words according to the countercurrent principle. The spraying apparatus is preferably located in the top part of a spraying tower. In this case, the dried material produced is separated from the air stream in particular by means of a cyclone separator, and can be taken off at this point. Also known is the continuous or discontinuous operation of spray dryers.

All conventional spraying apparatus is suitable in principle for implementing the method of the invention.

Suitable spraying nozzles are single-fluid nozzles and also multichannel nozzles such as two-fluid nozzles, three-channel nozzles or four-channel nozzles. Such nozzles may also be designed as what are called "ultrasound nozzles". Nozzles of these kinds are available commercially.

Furthermore, according to the type of nozzle, an atomizing gas may also be supplied. Atomizing gas used may be air or an inert gas such as nitrogen or argon. The gas pressure of the atomizing gas may be up to 1 MPa absolute, preferably 0.12 to 0.5 MPa absolute.

In one preferred embodiment, the aqueous suspension comprising the at least one water-soluble polymer comprising polyether groups and the inorganic component comprising the at least one phyllosilicate is produced ahead of the spray-drying step d). In this case, preferably, the aqueous suspension used in accordance with the invention is produced by mixing an aqueous solution of the polymer with the inorganic component comprising the at least one phyllosilicate. The inorganic component here may be in solid form, and more particularly in the form of a powder. As an alternative, however, it is also possible to use the inorganic component as a suspension.

Also suitable according to a further embodiment are special nozzles in which different liquid phases are mixed within the nozzle body and then atomized. In this case, an aqueous solution or an aqueous suspension comprising the at least one water-soluble polymer comprising polyether groups, and also an aqueous suspension comprising the inorganic component comprising the at least one phyllosilicate, can first be supplied separately to the nozzle and then mixed with one another within the nozzle head.

One embodiment of the invention relates to ultrasonic nozzles. Ultrasonic nozzles may be operated with or without atomizing gas. With ultrasonic nozzles, atomization is produced by the imparting of vibrations to the phase that is to be atomized. Depending on nozzle size and design, the ultrasonic nozzles may be operated with a frequency of 16 to 120 kHz.

The throughput of liquid phase to be sprayed per nozzle is dependent on the nozzle size. The throughput may be 500 g/h to 1000 kg/h of solution or suspension. In the production of commercial quantities, the throughput is preferably in the range from 10 to 1000 kg/h.

If no atomizing gas is used, the liquid pressure may be 0.2 to 40 MPa absolute. If an atomizing gas is used, the liquid may be supplied unpressurized.

Furthermore, the spray-drying apparatus is supplied with a drying gas such as air or one of the aforementioned inert gases. The drying gas may be supplied in cocurrent or in countercurrent to the sprayed liquid, preferably in cocurrent. The entry temperature of the drying gas may be 120 to 300° C., preferably 150 to 230° C., the exit temperature 60 to 135° C.

As already mentioned, the magnitudes of the spraying parameters to be used, such as throughput, gas pressure or nozzle diameter, are critically dependent on the size of the apparatus. The apparatus is available commercially, and appropriate magnitudes are normally recommended by the manufacturer.

In accordance with the invention, the spraying process is preferably operated such that the average droplet size of the sprayed phases is 5 to 2000 μm, preferably 5 to 500 μm, more preferably 5 to 200 μm. The average droplet size may be determined by laser diffraction or high-speed cameras coupled with an image analysis system. The above details relating to the spraying process may be applied to all preferred and particularly preferred embodiments that are outlined below. Preferred spraying parameters are also preferred in connection with the embodiments below.

In a particular embodiment of the method, the spraying nozzle is a multichannel nozzle.

In an alternative embodiment, the components are sprayed through a multichannel nozzle and are contacted with one another at the exit of the spraying nozzle. The multichannel nozzle may preferably be a three-channel nozzle or else a two-channel nozzle. In the case of the three-channel nozzle, an atomizer gas, more preferably air or nitrogen, is preferably used in one of the three channels, while the other two channels are I) an aqueous solution or an aqueous suspension comprising the at least one water-soluble polymer comprising polyether groups, and II) an aqueous suspension comprising the inorganic component comprising the at least one phyllosilicate. In the case of a two-channel nozzle, the required atomization of components I) and II) is achieved either through the use of ultrasound or through the use of a centrifugal force nozzle.

Preferred is the use of a three-channel nozzle having one channel for the atomizer gas and two channels for components I) and II). The channels for components I) and II) are separate, in the case both of a two-channel nozzle and of a three-channel nozzle, in order to prevent premature mixing of the components. Components I) and II) are contacted with one another not until exit of the two channels for components I) and II) of the spraying nozzle. The effect of the atomizer gas is to form fine droplets (a kind of mist) from the components I) and II) contacted with one another.

Preferred, however, is a method wherein the multichannel nozzle possesses two channels, with component I), an aqueous solution or an aqueous suspension comprising the at least one water-soluble polymer comprising polyether groups, and component II), comprising the inorganic component comprising the at least one phyllosilicate, being first premixed with one another and then supplied to the two-channel nozzle, the drying gas being introduced via the second channel.

In an additionally preferred embodiment of the invention, the aqueous suspension prior to spray drying comprises 1 to 55 wt %, preferably 5 to 30 wt %, of the water-soluble polymer comprising polyether groups and 6 to 75 wt %, preferably 15 to 60 wt %, of the inorganic component comprising the at least one phyllosilicate, and also 20 to 80 wt %, preferably 35 to 75 wt %, of water.

In the context of the present invention, it is preferred if the aqueous suspension in method step c) is produced ad preheated before entry into the spray dryer. In an alternative embodiment, components I) and II) as well, independently of one another, may be preheated prior to entry into the spray dryer. The admission temperature of component I) and, independently thereof, of component II), or the admission temperature of the mixture to the spray dryer, may be between 50 and 200° C., preferably between 70 and 130° C. The pulverulent solid obtained may be subsequently sieved to remove agglomerates. In one preferred embodiment, the solid obtained by the method of the invention is obtained in the form of a dry powder which possesses good flowability.

The powder may also, however, be converted into a different solid form by means of pressure, for example. Another possibility is for the powders obtained to be pelletized by the customary methods. Hence the method of the invention also encompasses solid dispersants in the form of pellets or granules. The method of the invention therefore preferably provides for the solid obtained after spray drying to be in the form of powder or granules.

The quantities employed in steps a) and b) are preferably selected such that the solid obtained after spray drying comprises 5 to 70 wt %, preferably 15 to 60 wt %, and especially preferably 20 to 40 wt %, of the at least one water-soluble polymer comprising polyether groups, and 30 to 95 wt %, preferably 30 to 85 wt %, and especially preferably 50 to 80 wt % of the at least one phyllosilicate.

The aqueous suspension used in the method of the invention may also comprise further additives. In an alternative embodiment, components I) and II) independently of one another may comprise further additives. These additives may in particular be stabilizers or byproducts from the production process. For example, salts, especially buffer salts, alcohols, polysaccharides, sulfonate salts, antifoams, polyether, air entrainers, retardants, accelerators, hydrophobicizing agents, and shrinkage reducers may be included. Furthermore, antioxidants or stabilizers in particular may be added as additives, the stabilizers in question being preferably those disclosed in WO 00/17263 from page 4, line 4 to page 9, line 22. The stabilizer may more particularly be a product sold under the brand name Additin from Rhein Chemie GmbH, especially Additin RC 7135. The amount of additives, based on the spray-dried product, is preferably below 10 wt %, more preferably below 5 wt %, and more particularly less than 3 wt %.

After suspension in water (50 wt % suspension), the solid obtained by the method of the invention preferably has a pH of between 2 and 9, more preferably between 3.5 and 6.5. In one specific embodiment, it is also possible for the pH of the aqueous suspension used in accordance with the invention to be adjusted by addition of an acid or a base ahead of spray drying.

In accordance with the invention, use is made of at least one phyllosilicate which has an integral sheet charge of 0, 1 or 2. Phyllosilicates for the purposes of the present invention are silicates whose silicate anions are present in sheets of corner-sharing $SiO_4$ tetrahedra. These sheets or double sheets are linked to one another not via further Si—O bonds to form scaffolds. The sheets here may comprise further elements, especially aluminum, iron and/or magnesium.

In one preferred embodiment, the at least one phyllosilicate of the invention is a clay mineral. This term refers to phyllosilicates which as well as the tetrahedral sheets having corner-sharing $SiO_4$ tetrahedra additionally comprise octahedral sheets made up of edge-sharing $AlO_6$ octahedra. The sheets here may comprise further elements. With particular preference, the silicon atoms in the tetrahedral sheet may be partly replaced by aluminum, and the aluminum atoms in the octahedral sheet may be partly replaced by magnesium. The at least one phyllosilicate is preferably a 1:1 clay mineral having a sheet charge of 0.

In particular, the at least one phyllosilicate may comprise talc, true mica, and kaolinite. With regard to the true mica, it is with particular preference muscovite. With particular preference additionally, the phyllosilicate of the invention comprises kaolinite. In particular, the inorganic component in step b) may comprise kaolin and more particularly may consist of kaolin.

The inorganic component b) preferably has an average particle size (d50%) as determined by laser diffractometry of between 100 nm and 2000 nm.

The spray drying of the invention allows a very fine powder to be obtained. With preference, the particle size of the spray-dried powder, based on at least 98% of the particles, is below 1000 µm, preferably below 750 µm, especially more preferably below 500 µm. The particle size here is determined by laser diffractometry. An example of a suitable instrument for determining the particle size is the Mastersizer 2000 from Malvern Instruments Ltd.

In one preferred embodiment the average particle size (d50%) is between 50 and 150 µm, preferably between 70 and 125 µm.

A further subject of the invention is a dispersant which is obtained by the method of the invention.

The present invention further envisages the use of the dispersant which has been obtained by the method of the invention in an inorganic binder composition.

The inorganic binder preferably comprises at least one from the group consisting of cement based on Portland cement, white cement, calcium aluminate cement, calcium sulfoaluminate cement, calcium sulfate n-hydrate, and latent hydraulic and/or puzzolanic binder.

The binder composition is preferably a dry-mix mortar. As a result of continual effort toward extensive rationalization and also improved product quality, mortars for a very wide variety of different uses within the construction sector are nowadays hardly any longer mixed together from the starting materials on the building site itself. This function is nowadays largely carried out by the construction materials industry in the factory, and the ready-to-use mixtures are provided in the form of what are called factory dry-mix mortars. Finished mixtures which can be made workable on site exclusively by addition of water and mixing are referred to, according to DIN 18557, as factory mortars, more particularly as factory dry-mix mortars. Mortar systems of this kind may fulfill any of a very wide variety of physical construction objectives. Depending on the objective that exists, the binder—which may comprise, for example, cement and/or lime and/or calcium sulfate—is admixed with further additives and/or admixtures in order to adapt the factory dry-mix mortar to the specific application. The additives and admixtures in question may comprise, for example, shrinkage reducers, expansion agents, accelerators, retardants, dispersants, thickeners, defoamers, air entrainers, and corrosion inhibitors.

The factory dry-mix mortar of the invention may in particular comprise masonry mortars, render mortars, mortars for thermal insulation composite systems, renovating renders, jointing mortars, tile adhesives, thin-bed mortars, screed mortars, casting mortars, injection mortars, filling compounds, grouts, or lining mortars (for drinking-water pipes, for example).

Also included are factory mortars which on production on the building site may be provided not only with water but also with further components, especially liquid and/or pulverulent additives, and/or with aggregate (two-component systems).

The binder composition of the invention, comprising at least one inorganic binder, may in particular also comprise a binder mixture as its binder. Understood as such in the present context are mixtures of at least two binders from the group consisting of cement, puzzolanic and/or latent hydraulic binder, white cement, specialty cement, calcium aluminate cement, calcium sulfoaluminate cement, and the various hydrous and anhydrous calcium sulfates. These mixtures may then optionally comprise further additives.

The examples which follow are intended to elucidate the invention in more detail.

EXAMPLES

Polymers

Polymer 1 is a copolymer of hydroxyethyl acrylate and ethoxylated isoprenol having 23 ethylene oxide units (EO). The molecular weight (Mw) is 20 000 g/mol. The copolymer was prepared as follows: a glass reactor was fitted with a stirrer mechanism, pH meter, and metering units and was charged with 267 g of water. 330 g of the melted ethoxylated isoprenol were mixed with the water. The temperature was set at 13° C. and the pH at around 7 by addition of 25% sulfuric acid. This mixture was admixed with 4 mg of iron(II) sulfate heptahydrate, 8.25 g of mercaptoethanol, and 3.2 g of hydrogen peroxide. After that a solution of 200 g of water and 136 g of hydroxyethyl acrylate and also 5 g of Brüggolit E01 and 32 g of water were added over a period of 20 minutes. During the reaction the pH was maintained at 7 by addition of 50% NaOH.

Polymer 2 is a copolymer of two ethoxylated isoprenols with different chain lengths of the ethylene oxide units (23 EO and 10 EO in a molar ratio of 1/1) and acrylic acid. The copolymer was prepared as follows: a glass reactor equipped with a plurality of feed facilities, stirrer, and dropping funnel was charged with 143 ml of water and 115 g of macromonomer 1 (prepared by ethoxylation of 3-methyl-3-buten-1-ol with 23 mol EO) and 50 g of macromonomer 2 (prepared by ethoxylation of 3-methyl-3-buten-1-ol with 10 EO) (solution A) and conditioned at 15.4° C. A portion of the second prepared, partially neutralized solution (solution B), consisting of 61.05 g of water and 12.28 g of acrylic acid (90 wt %), was added to solution A in the glass reactor over a period of 15 minutes. Additionally, 1.11 g of 3-mercaptopropionic acid were added to the reactor. A 3rd solution (solution C), was prepared, consisting of 3 g of sodium hydroxymethanesulfinate dihydrate and 47 g of water. Subsequently, at a temperature of 15.4° C., 46.5 mg of iron(II) sulfate heptahydrate, dissolved in a few drops of water, and 2.87 g of 30% hydrogen peroxide solution were added to solution A. In addition, over 45 minutes, the remaining solution B and, over 50 minutes, solution C were metered into solution A. To conclude, 25 ml of 20% sodium hydroxide solution were added and a pH of 6.5 was established.

The molecular weight was determined by gel permeation chromatography (GPC) with the following method: column combination: Shodex OH-Pak SB 804 HQ and OH-Pak SB 802.5 HQ from Showa Denko, Japan; eluent: 80 vol % aqueous solution of $HCO_2NH_4$ (0.05 mol/l) and 20 vol % MeOH; injection volume 100 µl; flow rate 0.5 ml/min. The molecular weight was calibrated using standards from PSS Polymer Standard Service, Germany. For the UV detector, poly(styrene-sulfonate) standards were used, and poly(ethylene oxide) standards for the RI detector. The molecular weight was determined using the results of the RI detector.

Spray Drying

A 40 wt % aqueous suspension was prepared from the respective carrier material. With vigorous stirring, the polymer was added in the form of 40 wt % aqueous solution. The suspensions were dried using a GEA Niro Mobile Minor MM-I spray dryer. Drying took place by means of a two-fluid nozzle at the top of the tower. Drying was carried out with nitrogen, which was blown in cocurrent with the material for drying, from top to bottom. 80 kg/h of drying gas were used for the drying. The temperature of the drying gas at the tower entry was 220° C. The feed rate of the material for drying was set such that the outgoing temperature of the drying gas at the tower exit was 100° C. The powder discharged from the drying tower with the drying gas was separated from the drying gas by means of a cyclone.

Spray-dryability was assessed as follows:

TABLE 1

| Grading | Description |
| --- | --- |
| 1 | Fine, dustlike powder in the sample glass beneath the cyclone; pipelines and cyclone exhibit only dustlike wetting; possibly, fine powder-like deposits in the cone of the drying tower |

TABLE 1-continued

| Grading | Description |
| --- | --- |
| 2 | Fine powder (d(90) particle size < 500 µm) in the sample glass beneath the cyclone; only slight deposits in cyclone and pipelines; possibly, fine powder-like deposits in the cone of the drying tower |
| 3 | Coarser powder (d(90) particle size > 500 µm) in the sample glass beneath the cyclone, deposits in cyclone and pipelines; after 10 seconds of mixing of the powder in a RETSCH Grindomix GM 200 at 8000 revolutions/min, a sample is obtained with particle sizes d(99) < 500 µm. |
| 4 | Possibly a few larger lumps in the sample glass beneath the cyclone, sample very largely in the dryer tower, severe encrustation in pipelines; 10 seconds of mixing in the RETSCH Grindomix GM 200 at 8000 revolutions/min produce a sample with particle sizes d(80) < 500 µm |
| 5 | Empty, possibly waxily wetted sample glass beneath the cyclone, sample very largely in the form of waxlike coating in dryer tower and pipelines |

The particle size was determined using a Mastersizer 2000 from Malvern Instruments. It represents the volumetric particle diameter.

The ground limestone used (trade name "Omyacarb 15" from Omya AG) possesses an average particle diameter of 12 µm. Kaolin is the commercial product "ASP 602" from BASF SE. The average particle diameter is 0.6 µm. Bentonite was acquired from Sigma Aldrich. The colloidal silica is the commercial product Bindzil 40/170 from Kurt Obermeier GmbH & Co. KG (40 wt %, average particle size 20 nm).

The thermomechanical properties of the powder were tested as follows:

All of the metal parts required were heated in a drying cabinet at 80° C. before use. A brass tube with a length of 70 mm and an internal diameter of 50 mm for a wall thickness of 2.5 mm were placed onto a brass baseplate with a tube attachment 7 mm high and 55 mm internal diameter. 2 g of powder were introduced into the pipe, followed by a brass cylinder having a weight of 1558 g. This cylinder was rotated by 360° 10 times without pressure. The cylinder and the pipe were then removed, and the sample was classed on the basis of the following factors:

TABLE 2

| Grading | Description |
| --- | --- |
| 1 | Sample is still in powder form |
| 2 | Sample is a compacted powder, and can be broken apart by the finger or the spatula without application of force |
| 3 | Sample undergoes compaction, force required in order to disintegrate the sample, possibly slightly tacky |
| 4 | Sample is of waxlike form; initially there are soft lumps, after cooling there are hard lumps |

Powders produced were as follows:

TABLE 3

| Powder | Polymer | Carrier [% of total weight] | Assessment A | Assessment B |
| --- | --- | --- | --- | --- |
| 1 | 1 | Finely ground limestone [80%] | 5 | 3 |
| 2 | 1 | Bentonite [80%] | 2 | 2 |
| 3 | 1 | Kaolin [80%] | 2 | 2 |
| 4 | 1 | Acrylic acid/ methacrylic acid/ methallylsulfonic acid (1/1/0.2) copolymer [80%] | 2 | 2 |

TABLE 3-continued

| Powder | Carrier Polymer [% of total weight] | | Assessment A | Assessment B |
|---|---|---|---|---|
| 5 | 1 | Colloidal silica [80%] | 2 | 2 |
| 6 | 2 | Kaolin [80%] | 2 | 2 |
| 7 | 2 | Bentonite [80%] | 2 | 2 |
| C1 | 1 | — | 5 | 4 |
| C2 | 2 | — | 5 | 4 |

Assessment A: Spray-dryability
Assessment B: After thermal/mechanical loading
C1: Comparative 1
C2: Comparative 2
Powders 3 and 6 are in accordance with the invention The resulting powders were tested for their usefulness in a dry-mix mortar:

The cement mortar was composed of 50.0 wt % of Portland cement (CEM I 52.5 N, Milke) and 50.0 wt % of standard sand (DIN EN 196-1). The water/cement ratio, also referred to as w/c, which indicates the weight ratio of water to cement, was 0.30. To plasticize the cement mortar, a powder according to table 3 or, as a comparative, polymer 1 or polymer 2 as a 40% aqueous solution, was added. The amount of the water-soluble polymer was 2 wt % in each case, based on the amount of cement. The cement mortar was produced in a method based on DIN EN 196-1:2005 in a mortar mixer having a capacity of approximately 5 liters. For the mixing procedure, water, power or the aqueous polymer solution according to table 3 and cement were placed into the mixing vessel. Immediately thereafter the mixing operation was commenced, with the fluidizer at low speed (140 revolutions per minute (rpm)). After 30 seconds, the standard sand was added at a uniform rate within 30 seconds to the mixture. The mixture was then switched to a higher speed (285 rpm) and mixing was continued for 30 seconds more. The mixer was subsequently halted for 90 seconds. During the first 30 seconds, the cement mortar, which stuck to the wall and to the lower part of the bowl, was removed using a rubber scraper and was put into the middle of the bowl. After the break, the cement mortar was mixed at the higher mixing speed for a further 60 seconds. The total mixing time was 4 minutes.

Immediately after the end of the mixing operation, the slump flow was determined on all samples, using a Hägermann cone, with no compaction energy being supplied, in a method based on the SVB guidelines of the Deutscher Ausschuss für Stahlbeton (German Reinforced Concrete Committee; see: Deutscher Ausschuss für Stahlbetonbau (ed.): DAfStb—Guidelines for self-compacting concrete (SVB Guidelines), Berlin, 2003). The Hägermann cone (d top=70 mm, d bottom=100 mm, h=60 mm) was placed centrally on a dry glass plate having a diameter of 400 mm and was filled with cement mortar to the level intended. Immediately after leveling had taken place, or 5 minutes after the first contact between cement and water, the Hägermann cone was taken off, held over the slumping cement mortar for 30 seconds to allow for dripping, and then removed. As soon as the slump flow came to a standstill, the diameter was determined, using a caliper gauge, at two axes lying at right angles to one another, and the average was calculated. The slump flow profile over time was characterized by repeating the test after 10, 20, 30, 45, 60, 90, and 120 minutes. Prior to each test, the cement mortar was mixed up in a mortar mixer at a rate of 140 revolutions per minute (rpm) for 10 seconds.

The end of solidification was determined on the cement paste in an analogy to DIN EN 196-3 using a Vicat needle instrument.

TABLE 4

| Experiment | Slump flow | | | | | End of solid- ification |
|---|---|---|---|---|---|---|
| | 10 min | 20 min | 30 min | 45 min | 60 min | |
| Powder 1 | 10 cm | 10 cm | 10 cm | 11 cm | 14 cm | 246 min |
| Powder 2 | 10 cm | 10 cm | 10 cm | 10 cm | 10 cm | 295 min |
| Powder 3 | 10 cm | 10 cm | 11 cm | 17 cm | 22 cm | 245 min |
| Powder 4 | 10 cm | 10 cm | 15 cm | 23 cm | 28 cm | 586 min |
| Powder 5 | 10 cm | 10 cm | 10 cm | 14 cm | 16 cm | 247 min |
| Powder 6 | 30 cm | 30 cm | 31 cm | 31 cm | 32 cm | |
| Powder 7 | 10 cm | 10 cm | 10 cm | 10 cm | 10 cm | |
| Polymer 1 | 10 cm | 10 cm | 11 cm | 17 cm | 22 cm | 245 min |
| Polymer 2 | 30 cm | 30 cm | 31 cm | 31 cm | 32 cm | |

Polymer 1 and Polymer 2 were metered in as a 40% aqueous solution

From table 4 it is apparent that only the inventive powder 3 (polymer 1) develops its effect on slump flow in line with the aqueous solution of polymer 1 and, furthermore, the inventive powder 6 (polymer 2) develops its activity in line with the aqueous solution of polymer 2.

The use of other carriers, such as bentonite (powder 2, cf. JP H06-239652), for instance, leads in contrast to a markedly different development of effect in terms of slump flow.

In order to show further advantages of the inventive powders relative to powders according to prior art, comparative experiments were carried out in analogy to powder 3 (see table 3). For this purpose, in experiment C3, from the same amount of anhydrous raw material, a mixture was prepared from the inorganic powder (kaolin) with the vacuum-dried, resinous dispersant (cf. DE 199 05 488). The resulting mixture was ground to give a particle size comparable with that of powder 3.

In a further experiment, C4, the inorganic powder (kaolin) was added in the drying tower during spray drying (cf. JP 2001294463). In this case, dry kaolin was metered via a stream of nitrogen into the upper part of the spraying tower. Portions of the kaolin underwent adsorption on the pasty material that forms, but the major part of the kaolin was discharged via the cyclone of the spray dryer. The polymer, however, remained in the dryer tower or the discharging pipes or in the cyclone.

TABLE 5

| Powder | Carrier Polymer [% of total weight] | | Assessment A | Assessment B |
|---|---|---|---|---|
| 3 | 1 | Kaolin [80%] | 2 | 2 |
| C3 | 1 | Kaolin [80%] | — | 3 |
| C4 | 1 | Kaolin [80%] | 5 | Pastelike |

For the determination of the caking tendency of the powder products, a quantity of powder presieved with a sieve having a mesh size of 500 μm underwent a 7.5 kg load for 10 days in a drying cabinet at 40° C., after which the coarse fraction possibly present in the powder was determined by sieving via a screen having a mesh size of 1000 μm.

TABLE 6

| Powder | Sieve residue |
|---|---|
| 3 | 0.5 g |
| C3 | 7.2 g |

The invention claimed is:

1. A method for producing a dispersant, comprising the steps of
   a) providing at least one water-soluble polymer comprising polyether groups,
   b) providing an inorganic component, comprising at least one phyllosilicate which has an integral sheet charge of 0, 1 or 2,
   c) preparing an aqueous suspension comprising the at least one water-soluble polymer comprising polyether groups and the inorganic component comprising the at least one phyllosilicate,
   d) spray-drying the aqueous suspension to give a solid.

2. The method according to claim 1, wherein the polyether groups of the at least one water-soluble polymer are polyether groups of structural unit (I),

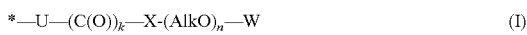

where
* indicates the bonding site to the polymer,
U is a chemical bond or an alkylene group having 1 to 8 carbon atoms,
X is oxygen, sulfur or a group $NR^1$,
k is 0 or 1,
n is an integer whose average value based on the polymer is in the range from 3 to 300,
Alk is $C_2$-$C_4$ alkylene, it being possible for Alk to be identical or different within the group $(Alk-O)_n$,
W is a hydrogen, a $C_1$-$C_6$ alkyl or an aryl radical or is the group Y—F, where
Y is a linear or branched alkylene group having 2 to 8 carbon atoms and may carry a phenyl ring,
F is a 5- to 10-membered nitrogen heterocycle which is bonded via nitrogen and which as ring members, besides the nitrogen atom and besides carbon atoms, may have 1, 2 or 3 additional heteroatoms, selected from oxygen, nitrogen, and sulfur, it being possible for the nitrogen ring members to have a group $R^2$, and for 1 or 2 carbon ring members to be present in the form of a carbonyl group,
$R^1$ is hydrogen, $C_1$-$C_4$ alkyl or benzyl, and
$R^2$ is hydrogen, $C_1$-$C_4$ alkyl or benzyl.

3. The method according to claim 1, wherein the water-soluble polymer comprises at least one group from the series consisting of carboxyester, carboxyl, phosphono, sulfino, sulfo, sulfamido, sulfoxy, sulfoalkyloxy, sulfinoalkyloxy, and phosphonooxy.

4. The method according to claim 1, wherein the water-soluble polymer comprising polyether groups represents a polycondensation product comprising
   (II) a structural unit comprising an aromatic or heteroaromatic and the polyether group, and
   (III) a phosphated structural unit comprising an aromatic or heteroaromatic.

5. The method according to claim 4, wherein the structural units (II) and (III) are represented by the following general formulae

where
A is identical or different and is represented by a substituted or unsubstituted, aromatic or heteroaromatic compound having 5 to 10 carbon atoms in the aromatic system, the other radicals possessing the definition stated for structural unit (I);

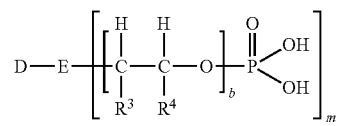

where
D is identical or different and is represented by a substituted or unsubstituted, aromatic or heteroaromatic compound having 5 to 10 carbon atoms in the aromatic system
where
E is identical or different and is represented by N, NH or O
where
m=2 if E=N and m=1 if E=NH or O
where
$R^3$ and $R^4$ independently of one another are identical or different and are represented by a branched or unbranched $C_1$ to $C_{10}$ alkyl radical, $C_5$ to $C_8$ cycloalkyl radical, aryl radical, heteroaryl radical or H
where b
is identical or different and is represented by an integer from 0 to 300.

6. The method according to claim 4, wherein the polycondensation product comprises a further structural unit (IV) which is represented by the following formula

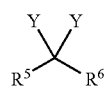

where
Y independently of one another is identical or different and is represented by (II), (III) or further constituents of the polycondensation product
$R^5$ and $R^6$ are identical or different and are represented by H, $CH_3$, COOH, or a substituted or unsubstituted, aromatic or heteroaromatic compound having 5 to 10 carbon atoms.

7. The method according to claim 1, wherein the water-soluble polymer comprising polyether groups represents at least one copolymer which is obtainable by polymerizing a mixture of monomers comprising
   (V) at least one ethylenically unsaturated monomer which comprises at least one radical from the series consisting of carboxylic acid, carboxylic salt, carboxylic ester, carboxylic amide, carboxylic anhydride, and carboxylic imide
   and
   (VI) at least one ethylenically unsaturated monomer comprising the polyether group.

8. The method according to claim 7, wherein the ethylenically unsaturated monomer (V) is represented by at least one of the following general formulae from the group of (Va), (Vb), and (Vc)

-continued

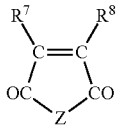
(Vb)

where
R⁷ and R⁸ independently of one another are hydrogen or an aliphatic hydrocarbon radical having 1 to 20 carbon atoms B is H, —COOM$_a$, —CO—O(C$_q$H$_{2q}$O)$_r$—R⁹, or —CO—NH—(C$_q$H$_{2q}$O)$_r$—R⁹

M is hydrogen, a mono-, di- or trivalent metal cation, ammonium ion or an organic amine radical a is ⅓, ½ or 1

R⁹ is hydrogen, an aliphatic hydrocarbon radical having 1 to 20 carbon atoms, a cycloaliphatic hydrocarbon radical having 5 to 8 carbon atoms, or an optionally substituted aryl radical having 6 to 14 carbon atoms q independently of one another for each (C$_q$H$_{2q}$O) unit is identical or different and is 2, 3 or 4, and r is 0 to 200

Z is O, or NR¹⁶

R¹⁶ independently at each occurrence is identical or different and is represented by a branched or unbranched C$_1$- to C$_{10}$-alkyl radical, C$_5$- to C$_8$ cycloalkyl radical, aryl radical, heteroaryl radical or H,

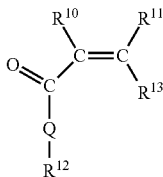
(Vc)

where
R¹⁹ and R¹¹ independently of one another are hydrogen or an aliphatic hydrocarbon radical having 1 to 20 carbon atoms, a cycloaliphatic hydrocarbon radical having 5 to 8 carbon atoms, or an optionally substituted aryl radical having 6 to 14 carbon atoms R¹² is identical or different and is represented by (C$_n$H$_{2n}$)—SO$_3$H where n=0, 1, 2, 3 or 4, (C$_n$H$_{2n}$)—OH where n=0, 1, 2, 3 or 4; (C$_n$H$_{2n}$)—PO$_3$H$_2$ where n=0, 1, 2, 3 or 4, (C$_n$H$_{2n}$)—OPO$_3$H$_2$ where n=0, 1, 2, 3 or 4, (C$_6$H$_4$)—SO$_3$H, (C$_6$H$_4$)—PO$_3$H$_2$, (C$_6$H$_4$)—OPO$_3$H$_2$, or (C$_n$H$_{2n}$)—NR¹⁴$_b$ where n=0, 1, 2, 3 or 4 and b=2 or 3

R¹³ is H, —COOM$_a$, —OC—O(C$_q$H$_{2q}$O)$_r$—R⁹, or —CO—NH—(C$_q$H$_{2q}$O)$_r$—R⁹, where M$_a$, R⁹, q, and r possess definitions stated above R¹⁴ is hydrogen, an aliphatic hydrocarbon radical having 1 to 10 carbon atoms, a cycloaliphatic hydrocarbon radical having 5 to 8 carbon atoms, or an optionally substituted aryl radical having 6 to 14 carbon atoms Q is identical or different and is represented by NH, NR¹⁵ or O; where R¹⁵ is an aliphatic hydrocarbon radical having 1 to 10 carbon atoms, a cycloaliphatic hydrocarbon radical having 5 to 8 carbon atoms, or an optionally substituted aryl radical having 6 to 14 carbon atoms.

9. The method according to claim 1, wherein the at least one water-soluble polymer comprising polyether groups has an average molar weight (Mw) of between 5000 and 150,000 g/mol, as determined by gel permeation chromatography.

10. The method according to claim 1, wherein the solid obtained after spray drying is in the form of powder or granules.

11. The method according to claim 1, wherein amounts used in steps a) and b) are selected such that the solid obtained after the spray drying comprises
5 to 70 wt % of the at least one water-soluble polymer comprising polyether groups and
30 to 95 wt % of the at least one phyllosilicate which has an integral sheet charge of 0, 1 or 2.

12. The method according to claim 1, wherein the at least one phyllosilicate is a 1:1 clay mineral having a sheet charge of 0.

13. The method according to claim 1, wherein b) the inorganic component has an average particle size (d50%) as determined by laser diffractometry of between 100 nm and 2000 nm.

\* \* \* \* \*